United States Patent [19]

Hockin, deceased et al.

[11] 4,378,243
[45] Mar. 29, 1983

[54] SYSTEM FOR COAL BLOWING IN IRON OXIDE REDUCING KILNS

[75] Inventors: Harry W. Hockin, deceased, late of Attadale, Australia, by Jane S. Hockin, executrix; Brian F. Bracanin, Burselton; Ronald J. Clements, West Australia; Vitie P. Keran, Bunbury, all of Australia; Alan C. Baker; Thomas W. Goodell, both of Harriman, Tenn.

[73] Assignee: The Direct Reduction Corporation, New York, N.Y.

[21] Appl. No.: 266,602

[22] Filed: May 22, 1981

[51] Int. Cl.³ .............................................. C21B 13/08
[52] U.S. Cl. ...................................... 75/90 R; 75/36; 266/173
[58] Field of Search .................. 75/36, 33, 34, 35, 37, 75/38; 266/173

[56] References Cited

U.S. PATENT DOCUMENTS

| | | | |
|---|---|---|---|
| 707,638 | 8/1902 | Reynolds | 75/36 |
| 1,977,767 | 10/1934 | Klencke | 266/173 |
| 2,484,911 | 10/1949 | Seil | 75/36 |
| 3,170,786 | 2/1965 | Moklebust | 76/36 |
| 3,505,060 | 4/1970 | Heitmann | 75/1 |
| 3,663,201 | 5/1972 | Heitmann | 75/36 X |
| 4,304,597 | 12/1981 | Keran et al. | 266/173 |

OTHER PUBLICATIONS

Meyer et al. Journal of Metals Jun. 1966, pp. 748–752.

Primary Examiner—Melvyn J. Andrews
Attorney, Agent, or Firm—Cooper, Dunham, Clark, Griffin & Moran

[57] ABSTRACT

A method and means for improved control of the process for directly reducing materials containing iron oxides in a rotary kiln using a solid carbonaceous reducing agent, such as coal, introduced from the charge feed and discharge ends of the kiln, as the source of both fuel and reductant, and oxygen-containing gas introduced along the kiln length is disclosed wherein the portion of the reducing agent fed at the discharge end is blown as a stream in a prescribed manner into the discharge end of the kiln. In particular, the important features of the stream are described including its longitudinal distribution and axial spread over the charge bed, as well as its contact region with the kiln walls and the quandrants of the kiln barrel into which it is directed, whereby the bed and gas phase temperatures may be controlled and heat transfer to the bed enhanced.

15 Claims, 4 Drawing Figures

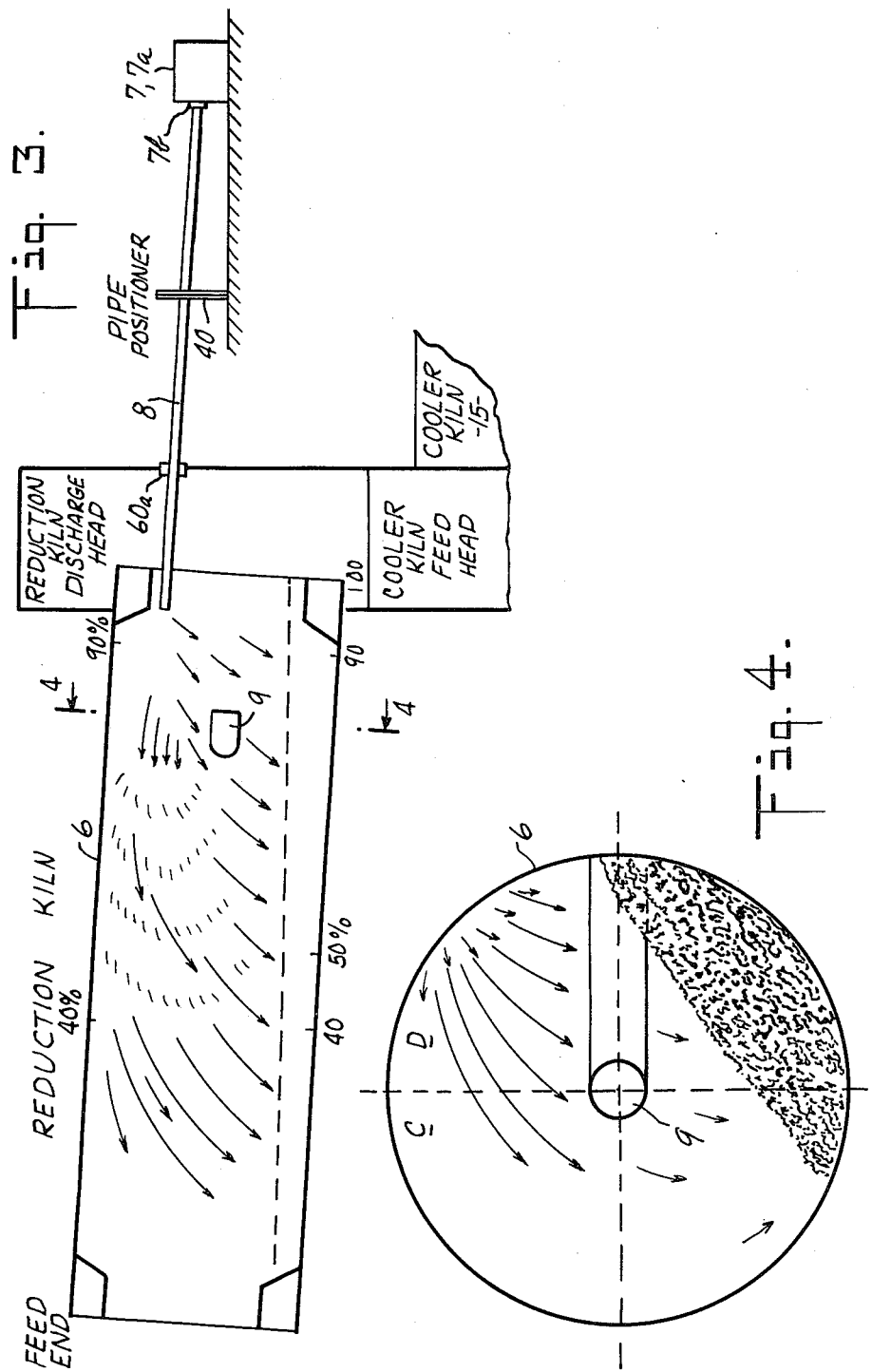

SYSTEM FOR COAL BLOWING IN IRON OXIDE REDUCING KILNS

BACKGROUND OF THE INVENTION

The present invention relates to a process for producing directly reduced iron (DRI) or other mineral products by directly reducing materials containing iron oxides in a rotary kiln using a solid carbonaceous reducing agent, such as coal, and, more particularly, to a method and means for blowing reducing agent into the discharge end of the kiln in an improved manner.

Many different methods have been suggested and used for carrying out the direct reduction of ores and other materials containing iron oxides using solid carbonaceous materials, particularly coal, in a rotary kiln to produce directly reduced iron (DRI) and other mineral products. For example, in some of these processes the coal is fed into the kiln through the discharge end by mechanical or pneumatic means, such as respectively disclosed in U.S. Pat. No. 3,113,859 to Moklebust and U.S. Pat. No. 3,505,060 to Heitmann, and in some it is fed at the center of or along the kiln, such as disclosed in U.S. Pat. No. 3,206,299 to Senior et al. However, considerable problems have been encountered with these various approaches, many of which problems have been overcome by the process disclosed in U.S. Pat. No. 3,890,138 to Hockin. In this latter process a portion of the coal is injected or blown from the discharge end of the kiln, and the remaining portion of the coal is fed with the ore at the charge feed end. The kiln is generally divided into a reducing zone toward the discharge end and a preheat zone toward the feed end, and the coal is distributed in the kiln in such a manner that the amount of coal injected from the discharge end is sufficient to aid in controlling the temperature profile throughout both zones of the kiln.

Although the process of Hockin was developed particularly for use in reducing ilmenite, it has been found that the dual end feeding technique improves upon the other solid reducing agent feeding methods used in reducing iron-oxide-containing materials in rotary kilns to produce directly reduced iron (DRI) or to produce other mineral products with the direct reduction process, and the present invention relates generally to improvements in the latter processes particularly with regard to the control of the feeding through the discharge end.

SUMMARY OF THE INVENTION

The present invention involves a method and means for controlling bed and gas phase temperatures in a rotary kiln for directly reducing materials containing iron oxides using a solid carbonaceous reducing agent, introduced from the charge feed and discharge ends of the kiln, as the source of both fuel and reductant, and oxygen-containing gas introduced along the kiln length. By carefully regulating the feeding or injection of the reducing agent at the discharge end, through appropriate adjustment of the rate and manner of injection, optimum distribution of the reducing agent over the kiln bed may be achieved for carrying out the direct reduction process. The adjustments are made until the process conditions are optimized by varying what have been found to be key factors in generating and directing the reducing agent stream to control the distribution. These factors are the size distribution of the reducing agent particles and the injecting force behind the stream, as well as the quadrant of the kiln barrel into which the stream is directed, and the contact region of the stream with the kiln walls.

In particular, the reducing agent, preferably in the form of particles of coal, and/or recycle charred coal or char, and/or other carbonaceous materials such as wood chips and similar biofuels with a size distribution typically ranging from about ¼ inch and less, is blown by low pressure air of about 5 to 10 psi from the end of a pipe extending into the discharge end of the kiln. The longitudinal distribution of the reducing agent or coal stream may extend over 75% of the kiln length, and may be incorporated in the bed over the entire gas/bed interface in the working zone, and correct distribution and spreading of the coal may be achieved by bouncing the coal stream off the kiln walls in the area between the 40% and 90% kiln length points from the feed end. The stream also should be directed into one or the other of the two upper quadrants of the kiln when bouncing the stream off the kiln walls. Also, when using coal as the reducing agent, coals with greater than 3% volatile content are preferred.

It has been found that with proper regulation of the blown stream of carbonaceous reducing agent in the manner described, and using particles of appropriate sizing, close control of overall kiln performance with considerably improved temperature control, and accordingly improved efficiency of the process, can be achieved.

BRIEF DESCRIPTION OF THE DRAWINGS

FIG. 3 is a diagrammatic view of the rotary kiln along with the coal injecting apparatus at the discharge end illustrating the coal blowing technique of the present invention.

FIG. 4 is a sectional view taken along the lines 4—4 in FIG. 3.

DETAILED DESCRIPTION OF THE PREFERRED EMBODIMENT

Figure 1:
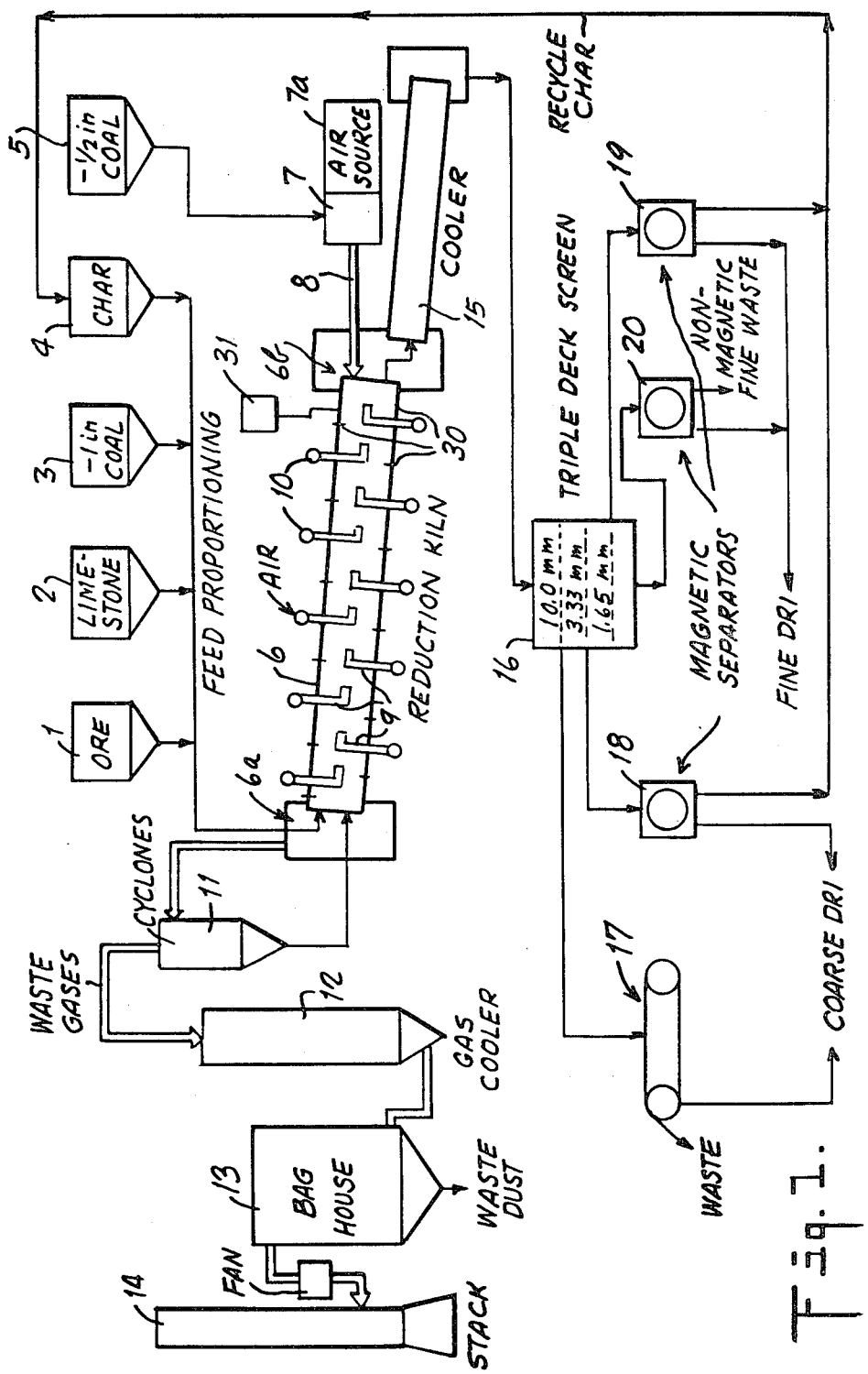
FIG. 1 is a diagrammatic view of a direct reduction plant illustrating the steps and the appropriate equipment including a rotary kiln for carrying out a process for the production of sponge iron or DRI, in which plant and process the present invention may be applied.

A flow diagram of a direct reduction plant for the production of DRI or other mineral products, of the type utilizing a rotary kiln, into which a solid carbonaceous material acting as the source of both fuel and reductant is fed at both the charge feed end and the discharge end, and in connection with which the present invention may be practiced, is shown in FIG. 1. The plant comprises an array of feed bins respectively including: a bin 1 for supplying iron oxide containing materials such as ore, typically in the form of iron oxide pellets or natural lump ore; a bin 2 for providing limestone or dolomite for sulfur control; a bin 3 for providing a suitable carbonaceous reducing agent, typically in the form of coal of less than 1 inch nominal diameter particles; and a bin 4 for supplying recycle char. The iron ore, coal, return or recycle char, and dolomite or limestone are accurately proportioned and fed continuously as a charge to the feed end 6a of a typical reduction kiln 6. A remaining bin 5 supplies additional reducing agent, such as coal, typically of less than ½ inch nominal diameter particles, to the discharge end 6b of the rotary kiln 6, where carefully controlled quantities are injected or blown in. The latter coal is fed to a fireman device 7 from which it is blown by means of low pressure carrier air from a suitable source 7a, preferably a positive displacement blower, through a coal injection pipe 8 which can be adjusted to achieve the optimum trajectory for this coal. A suitable system for the blowing and adjusting is disclosed in U.S. Pat. No. 4,306,643, assigned to the same assignee as the present application.

The reduction kiln 6 may, by way of example, be 11.5 feet (3.5 meters) in outside shell diameter and 148 feet (45 meters) long, sloped at 3%. It may be supported on two tires and driven by a 200 horsepower variable speed D.C. motor and lined with 8 inches of castable refractory.

In addition to the introduction of carrier air through pipe 8, the kiln is equipped with a series of shell-mounted air injection tubes 9, typically ten in number which are spaced along its length and extend into the interior of the kiln for drawing air from the outside and injecting it along the kiln axis to enhance combustion. Each of the tubes 9 is equipped with its own fan and motor combination 10 so that the rate of injection may be independently and properly regulated at spaced positions along the kiln. Also, spaced along the kiln is a series of thermocouples 30, typically twelve in number, which measure the average temperature of the charge in the kiln and of the gas.

The hot waste gas or off-gases exhaust from the feed end 6a of the kiln and pass into an off-gas processing or cleaning system. In a suitable cleaning system the gases may be passed first to twin refractory-lined scalping cyclones 11, which remove and recycle coarse dust and then to a 57 feet high by 11.5 feet inside diameter spray cooling tower 12 where they may be cooled to 260° C. before passing to an 8-cell bag house 13 equipped with glass fiber bags for removing the fine dust. The cleaned gases may exit via an induced draft fan and a 100 feet high stack 14.

The material discharged from the discharge end 6b of reduction kiln 6 by means of a sealed transfer chute consists of a mixture of DRI or other mineral products, coal char, coal ash and desulfurizing agent and other fine waste. This material is cooled in a rotary cooler 15 which is sealed from the ambient atmosphere, fitted with lifters, and cooled externally with water. The cooled mixture is then passed from the cooler 15 to a screening system 16, with apertures typically as noted in FIG. 1, and screened. The two oversized fractions are subject to magnetic separation in respective magnetic separators 17 and 18, and the remaining fines are magnetically separated in separators 19 and 20. Separators 17 and 18 remove the course DRI to the product load out area. The non-magnetic fractions from the separators 17, 18 and 19 are conveyed to the return char bin 4. This separation system then yields coarse and fine DRI, coarse and fine recycle char and fine nonmagnetic waste.

In a plant such as shown and described in connection with FIG. 1, with proper control of combustion conditions over the kiln bed and reduction conditions in the bed, optimum utilization of kiln volume, with metallization consistently over 90%, can be achieved.

Regarding the process itself, directly reducing iron oxides in the rotary kiln using solid carbonaceous material, such as coal, as the source of heat and reductant, and oxygen-containing gas involves complex gas/solid reaction mechanisms. Overall reduction kinetics are affected by bed temperature, solids particle size, carbon/iron oxide ratio in the bed, reactivity of the char produced from the coal, the effect of catalysts on char reactivity, and reducibility of the iron oxide. Control of the rate of heat transfer to the bed and control of bed temperature are critical parameters for steady operation of the kiln so that stable process chemistry and kinetics result.

The present invention optimizes this control by carefully regulating feeding of the reducing agent at the discharge end of the kiln through appropriate adjustment of the rate of blowing and the feed pipe orientation to achieve optimum distribution of the reducing agent over the kiln bed. The adjustments are made to vary what have been found to be the key parameters of the stream, that is, the longitudinal distribution and axial spread of the stream as well as its contact region with the kiln walls and the quadrant of the kiln barrel into which it is directed, until the process conditions are optimized.

The importance of the blowing technique will be better understood after first considering the reduction process involved in terms of the following simplified reactions:

$$Fe_2O_3 + CO \rightleftharpoons 2FeO + CO_2 \qquad (1)$$

$$FeO + CO \rightleftharpoons Fe + CO_2 \qquad (2)$$

$$CO_2 + C \rightleftharpoons 2CO \qquad (3)$$

Figure 2:
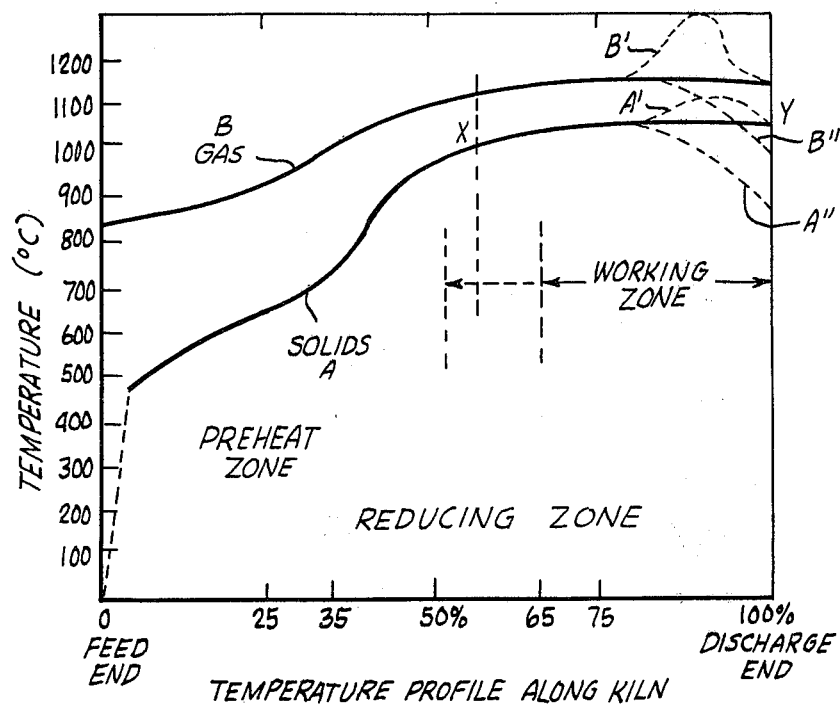
FIG. 2 is a plot of the temperature profiles in the gas and solids bed occurring along the length of the rotary kiln in keeping with the present invention.

The equilibria and rates of these reactions (1), (2), (3) approach optimum levels with increase in the temperature of the bed of solids in the rotating kiln. For this reason, reduction kilns are optimally operated at as high a temperature as can possibly be achieved without causing deleterious effects such as fusion or sintering of the solid charge materials. In particular, to ensure stable kiln operation, sintering and fluxing of coal ash, iron oxide fines and calcium oxide must be controlled. This limits the maximum temperature of kiln operation. FIG. 2 shows typical profiles of the solids temperature, Curve A, and gas temperature, Curve B, occurring within a kiln of the present type along its length. The kiln is generally regarded as having a preheat zone at the feed end which normally extends through about the first one-third of the kiln length and a reducing zone which extends for the remainder of the kiln length. The relative lengths of these two zones may vary depending upon where a significant part of the reduction actually begins, and will depend upon the bed components and kiln conditions. As seen in FIG. 2 the solids temperature profile, Curve A, shows that the solids temperature normally increases steadily from the feed end beyond the preheat zone of the kiln to a point X lying in the region from about 50% to 67% along the kiln length from the feed end. The solids temperature profile from point X to the discharge end of the kiln, point Y, is maintained relatively constant. The region from X to Y can be termed the "working zone" of the kiln where optimum operating temperature levels are sought and reactions (1), (2), and (3) proceed to completion at the highest rate possible at the temperature of the solid materials in the bed. As mentioned, the maximum operating temperature of the bed in this working zone is limited by the onset of sintering of the charge material, accretion formation on the kiln walls and other deleterious effects on overall performance and product quality. The permissible maximum temperature for a particular solids bed in the working zone depends on the properties of the specific coal or solid carbonaceous reducing agent that is used in the process because the temperature at which sintering occurs will vary with different coal ashes when mixed with the other solid phases in the bed of solids. As indicated in FIG. 2 a maximum temperature of about 1070° C. for the solids in the working zone and a solids temperature essentially below 750° C. in the preheat zone are typical operating temperatures which are not exceeded in most cases.

It will be appreciated that even, controlled release of heat along the kiln is required to avoid localized high temperatures or "hot spots" in the bed with consequent sintering, so that smooth control of the bed and gas temperature profiles is essential over the working zone of the kiln. Of importance in this regard is the combustion of the volatiles from the reducing agent or coal fed from the kiln discharge end, as this combustion supplements the heat generated by the combustion of carbon monoxide escaping from the bed. The discharge end coal lands in the bed, devolatilizes, and the volatiles generated, or a proportion thereof, together with CO escaping from the bed react with the air from the air tubes 9 in close proximity to the gas/bed interface. This oxidation reaction produces a hot gas region near the gas/bed interface which enhances heat transfer rates. Further, the reducing agent upon entering the kiln through the discharge end quickly forms significant numbers of incandescent solid particles which improve the radiative heat transfer to the solids bed. Thus, with improved discharge end coal blowing, larger quantities of total heat may be transferred to the bed at normal kiln operating temperatures by virtue of the enhancement of gas and incandescent particle radiation and to a somewhat lesser extent by convective and conductive mechanisms.

The preferred coal blowing technique to produce this enhanced heat transfer in accordance with the present invention will now be described with reference to FIGS. 3 and 4. Firstly, the pipe 8 and blowing apparatus 7, 7a as well as the positioning equipment 40 may be constructed in accordance with the system described in previously noted U.S. Pat. No. 4,306,643. Further, the reducing agent may consist of any suitable solid carbonaceous materials, such as coal, recycle char, wood chips, and other biofuels, either alone or in suitable mixtures, and the size of the particles is typically about ¼ inch and less. For the purpose of the description the reducing agent shall be referred to as coal, and if coal is actually used, it is preferably of about 3% or greater volatiles content.

To achieve optimum process control in blowing the coal it has been found, as noted above, that four important factors should be taken into consideration in regulating the coal stream flow in addition to the particle size distribution being ¼ inch or less. These are: (1) the longitudinal distribution of the coal stream; (2) the axial spread of the coal stream; (3) the contact region with the kiln walls of the coal stream; and (4) the quadrant of the kiln barrel into which the coal stream is directed.

In evaluating the flow parameters of the coal stream in these four regards for a specific process it must be kept in mind that the particular temperature levels, or temperature profile, along the bed that are appropriate for optimum operation of the process will, as already mentioned, depend upon the constituents of the solids in the bed and accordingly on the properties of the solid carbonaceous material, or coal, used as the reducing agent. Hence, the four appropriate parameters will vary with the reducing agent used, and the proper combination of these parameters for a given process will generally be determined empirically but within certain limits or guidelines in the manner as follows.

Firstly, it must be appreciated that the longitudinal distribution of the coal stream for optimum process control should be adjusted to satisfy the endothermic heat demands of the charge bed along the various increments of the kiln length. Specifically, the maximum percentage weight distribution of the blown coal should fall into the incremental portions of the bed requiring the greatest quantities of heat. Accordingly, the direction and distribution of the feeding is vital to process control.

The desired longitudinal distribution is obtained essentially by regulating three factors in feeding the blown-in coal to the kiln, which are: the use of a sized reducing agent such as the ¼ inch×0 coal mentioned; the physical configuration or orientation of the coal pipe 8, which is adjusted using the positioning equipment 40; and the volume of air flow through the pipe 8. Initially, the pipe orientation is adjusted to achieve the desired trajectory of the coal over the bed to cause deposition of coal all along the bed. The coal may be blown over more than 75% of the kiln length if required, and coal may be incorporated in the bed over the entire working zone, that is, at least a third of the kiln length from the discharge end. The distribution pattern of the coal is regulated by varying the air flow volume which in turn varies the air velocity through the pipe and tends to separate the coarser and finer coal particles by virtue of the difference in the distance of their travel along the bed. The air flow is preferably produced by a positive displacement blower, rather than by a compressor, so that the flow will be high in volume but low in pressure.

Next, the axial spread of the coal stream is similarly governed by the direction of orientation of the end of the pipe 8, the exit velocity of the coal therefrom, and additionally, by the diameter of the pipe end. The orientation of the pipe 8 as shown in FIG. 3 is adjusted by applying bending pressure to the pipe by means of the positioning device 40 (which, as noted, is preferably of the type disclosed in U.S. Pat. No. 4,306,643) and by using as braces a suitable collar 60a in the access port in the kiln discharge head 60 and a suitable bolt joint 7b at the pipe feed end connection to the blowing equipment 7, 7a. Regulation of the axial spread of the coal stream is important in incorporating coal over the entire gas/bed interface in the working zone.

The appropriate distribution and spreading of the coal over the bed may further be controlled by the third factor, that is, bouncing the coal stream off the kiln walls. It has been found that the wall area between about the 40% and 90% kiln length points, as indicated in FIG. 3, is the contact region which should be used, and that bouncing of the stream in this region is fundamental to achieving proper blown coal distribution for close process control.

Lastly, FIG. 4 illustrates the preferred quadrants C and D within the kiln barrel into which the coal should be directed in achieving suitable distribution. As seen in the figure, the kiln interior or barrel can be divided into two upper and two lower quadrants defined by a vertical plane and a plane perpendicularly intersecting the vertical plane along the kiln axis. Either of the upper two quadrants C or D may be used, but quadrant D will usually be employed for normal operation. However, when a coal is being used whose volatiles are evolved especially rapidly, then the stream may be directed into quadrant C to reduce the residence time of the blown coal particles on the bed surface.

It has been found that blown coal addition to the kiln with proper particle size distribution and careful adjustment of the feeding in accordance with the four indicated factors satisfies many important process control requirements. More particularly, combustion of the volatiles from the blown coal, when coal of appropriate sizing is used, supplies heat to incremental portions of the kiln bed where the combustion of CO escaping from the bed may not alone meet the heat demand. These incremental portions may occur where the heat requirement is especially high, such as regions where the bulk of oxide reduction is occurring and also in regions where the rate of evolution of CO is limited by either the working temperature or the availability of iron-bound oxygen for CO formation. Further, controlled, even heat release can be achieved within the kiln by the correct longitudinal distribution of the blown coal along the kiln bed towards the feed end, in combination with the use of metered air input at the respective air tubes 9 spaced along the kiln. This combination permits the bed and gas temperature profiles to be closely controlled, and avoids high and uncontrollable temperature and heat concentrations which might be induced in the process by the use of other fuels such as oil, gas, or pulverized solid fuel injection. Consequent and massive sintering can occur in regions where such heat concentrations or "hot spots" occur. Abnormally hot zones of this type are indicated by dotted curves A', B' in FIG. 2.

A further important control feature of the present invention involves control of the kiln exhaust gas temperatures. Kiln exhaust gas temperatures are governed primarily by the volatiles content of the coal being used and the in-kiln preheating zone combustion air addition. The typical temperature range of the exhaust gases may be from 500° C. for a low volatile coal to about 900° C. for a high volatile coal. Injection of a proportion of the coal from the discharge end in accordance with the described techniques of the present invention may actively depress this temperature by up to 200° C. This temperature depression phenomenon has been demonstrated during normal operation of a kiln such as shown in FIG. 1 by simply stopping the discharge end coal supply. It has been found under such circumstances that there is an immediate and sharp rise in the exhaust gas temperature which may be immediately reversed upon reestablishing the discharge end coal supply in the manner described. These results illustrate the improved heat transfer and combustion efficiency achieved with the described coal feeding technique, since reduction of the exhaust gas temperature indicates reduction in the heat waste to exhaust.

Also with the ceasing of blown coal feeding at the discharge end, the bed and gas temperatures at that end, and thus in the working zone, have been found to drop, as illustrated by the dashed curves A'', B'' in FIG. 2.

Following from these findings it appears to be preferable to supply a lower volatile coal at the feed end and a higher volatile coal at the discharge end, where such coals are available, to minimize the kiln exhaust temperatures and maximize the efficiency of the process. In an extreme case it will be seen that it may be possible to use a carbonaceous reducing agent with a very low volatiles content at the feed end if a coal having a sufficiently high volatiles content to satisfy the incremental heat demands in the charge bed is fed through the discharge end in a suitable manner as described.

It will therefore be seen that in accordance with the present invention suitable solid carbonaceous reducing agents, such as coals preferably of 3% or greater volatiles content, may be used for injection into the discharge end of a reducing kiln to produce the desired heat transfer to the charge bed as long as a satisfactory size distribution of the particles can be obtained, that is, particles sizes of about ½ inch and less. The coal and/or char and/or other carbonaceous agent may be incorporated into the entire length of the working zone of the bed, as demanded by the heat requirement. In achieving the proper distribution, the blown reducing agent is directed into one or the other upper quadrant of the kiln barrel and bounced off the walls within the region between 40% and 90% of the kiln length from the feed end. Proper distribution in this manner will form a hot gas region immediately above the gas/bed interface in which region combustion of the volatiles from the coal, when coal is fed at the discharge end, supplements heat generated by the combustion of CO escaping from the bed, producing improved heat transfer to the bed in the incremental portions having the greatest demand for heat. The blown coal also prevents depletion of char from certain charge bed regions wherein depletion may occur due to segregation or upset conditions caused by prolonged kiln stoppages. Consequently, by carefully regulating the low pressure air injection rate and direction, as well as the proportion and quality of discharge end reducing agent, close control of overall kiln performance can be achieved.

We claim:

1. A method of controlling heat transfer to the charge bed in a rotary kiln directly reducing materials containing metal oxides using a supply of solid carbonaceous reducing agent, a portion of which is fed through the charge feed end and the remaining portion of which is fed through the discharge end of the kiln, the interior barrel of which kiln has two upper and two lower quadrants defined by a vertical plane and a plane perpendicularly intersecting said vertical plane along the kiln axis, and which bed has a working zone over at least a third of the kiln length from the discharge end, comprising the steps of:

injecting metered amounts of oxygen-containing gas axially within the kiln at locations spaced along its length; feeding said remaining portion of the solid carbonaceous reducing agent through the discharge end of the kiln in particulate form over the surface of the charge bed; and adjusting the direction and distribution of the discharge end feeding to spread reducing agent over at least the gas/bed interface in the working zone of the kiln by blowing the particulate reducing agent through a pipe using low pressure air to form a stream of reducing agent; and orienting the pipe such that said stream is directed into one of the upper quadrants within the kiln barrel and bounces off the kiln wall in the region between about 40% and 90% of the kiln length from the charge feed end.

2. A method as in claim 1 wherein said pipe is oriented to distribute reducing agent over at least 75% of the kiln length from the discharge end.

3. A method as in claim 1 wherein the reducing agent stream is of particles of about ½ inch diameter and less.

4. A method as in claim 1 wherein the longitudinal distribution of the stream of reducing agent is varied by varying the volume of air flow through said pipe.

5. A method as in claim 1 comprising the further steps of selecting the diameter of the pipe end and setting the exit velocity of the reducing agent particles therefrom to determine the axial spread of the reducing agent stream.

6. A method as in claim 1 wherein the direction and distribution of discharge end feeding is adjusted such that the maximum percentage weight distribution of the reducing agent satisfies the incremental endothermic heat demands in the charge bed along the length of the kiln.

7. A method as in claim 1 wherein said reducing agent stream comprises coal having a volatiles content of about 3% and greater.

8. A method as in claim 1 wherein said reducing agent fed through the discharge end of the kiln comprises a coal having a sufficiently high volatiles content to satisfy the incremental endothermic heat demands in the charge bed along the kiln.

9. A method as in claim 1 wherein said reducing agent stream is of a material selected from the group consisting of coal, recycle char, wood chips, biofuels, and mixtures thereof.

10. A method as in claim 1 wherein said reducing agent stream comprises coal with rapidly evolving volatiles and said pipe is oriented such that said stream is directed into the one of the upper quadrants whereby the residence time of the coal particles of the stream on the surface of the charge bed is reduced.

11. A method for feeding solid carbonaceous reducing agent through the discharge end of a rotary kiln directly reducing materials containing metal oxides using a supply of solid carbonaceous reducing agent, a portion of which is fed through the charge feed end and the remaining portion of which is fed through the discharge end of the kiln, the interior barrel of which has two upper and two lower quadrants defined by a vertical plane and a plane perpendicularly intersecting said vertical plane along the kiln axis, comprising the steps of:

forming said remaining portion of the solid carbonaceous reducing agent into particles of about ½ inch diameter and less;

injecting the particles through the discharge end of the kiln in the form of a stream of particles; and spreading said particles over the gas/bed interface by directing said stream into one of the upper quadrants in the kiln barrel and bouncing it off the kiln wall in the region between about 40% and 90% of the kiln length from the charge feed end.

12. A method as in claim 11, wherein the particles are injected by being blown through a pipe using a low pressure propelling gas flow.

13. A method as in claim 12, wherein the gas flow is low pressure air and the longitudinal distribution of the stream of the reducing agent is varied by varying the volume of air flow through said pipe.

14. A system for controlling heat transfer to the charge bed in a rotary kiln directly reducing materials containing metal oxides using a supply of solid carbonaceous reducing agent, a portion of which is fed through the charge feed end and the remaining portion of which is fed through the discharge end of the kiln, which kiln has an interior barrel with two upper and two lower quadrants defined by a vertical plane and a plane perpendicularly intersecting said vertical plane along the kiln axis and which bed has a working zone over at least a third of the kiln length from the discharge end, comprising:

first means for injecting metered amounts of oxygen-containing gas axially within the kiln at locations spaced along its length;

second means for injecting said remaining portion of the solid carbonaceous reducing agent through the discharge end of the kiln in particulate form over the surface of the charge bed, said second injecting means comprising:

a pipe disposed at the discharge end of the kiln; and fireman means for feeding the solid carbonaceous reducing agent to said pipe; and means for adjusting the rate of injection of said reducing agent and the direction of injection to spread reducing agent over at least the gas/bed interface in the working zone of the kiln comprising:

means connected to said second injecting means for blowing the particulate reducing agent from said fireman means through said pipe using low pressure air to form a stream of reducing agent, said blowing means comprising a positive displacement blower; and means for orienting said pipe such that said stream is directed into one of the upper quadrants within the kiln barrel and bounces off the kiln wall in the region between about 40% and 90% of the kiln length from the charge feed end.

15. A system as in claim 14 wherein said positive displacement blower comprises means for varying the volume of air flow through said pipe to vary the longitudinal distance of travel of the reducing agent stream.

* * * * *